(12) United States Patent
Mochizuki

(10) Patent No.: US 12,104,035 B2
(45) Date of Patent: Oct. 1, 2024

(54) FOAM COMPOSITION, FOAM MEMBER AND METHOD OF MANUFACTURE

(71) Applicant: Bridgestone Sports Co., Ltd., Tokyo (JP)

(72) Inventor: Katsunobu Mochizuki, Saitamaken (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 0 days.

(21) Appl. No.: 18/223,795

(22) Filed: Jul. 19, 2023

(65) Prior Publication Data

US 2023/0357526 A1 Nov. 9, 2023

Related U.S. Application Data

(62) Division of application No. 16/720,955, filed on Dec. 19, 2019, now abandoned.

(30) Foreign Application Priority Data

Dec. 21, 2018 (JP) .................................. 2018-239788

(51) Int. Cl.
  *C08J 9/26* (2006.01)
  *A63B 37/00* (2006.01)

(52) U.S. Cl.
  CPC ............. *C08J 9/26* (2013.01); *A63B 37/0024* (2013.01); *A63B 37/0094* (2013.01); *C08J 2201/0446* (2013.01); *C08J 2375/08* (2013.01)

(58) Field of Classification Search
  CPC .................. C08J 9/26; A63B 37/0023–00376
  See application file for complete search history.

(56) References Cited

U.S. PATENT DOCUMENTS

| | | | |
|---|---|---|---|
| 4,226,886 A | 10/1980 | Lakes | |
| 4,274,637 A | 6/1981 | Molitor | |
| 5,181,717 A | 1/1993 | Donntag et al. | |
| 2004/0266559 A1* | 12/2004 | Asakura ............. | A63B 37/0004 473/378 |

FOREIGN PATENT DOCUMENTS

| | | | |
|---|---|---|---|
| GB | 1326442 A | | 8/1973 |
| GB | 1465557 A | | 2/1977 |
| JP | 54-3901 B | | 2/1979 |
| JP | 55-115433 A | | 9/1980 |
| JP | 01-212577 A | | 8/1989 |
| JP | 2-305579 A | | 12/1990 |
| JP | 3-174457 A | | 7/1991 |
| JP | 2001-81227 A | | 3/2001 |
| JP | 2001081227 A | * | 3/2001 |
| JP | 2005-046299 A | | 2/2005 |

OTHER PUBLICATIONS

Translation of JP 2001081227 by Takahashi et al (Year: 2001).*
Office Action dated Nov. 15, 2022 issued by the Japanese Patent Office in Japanese Application No. 2018-239788.

* cited by examiner

*Primary Examiner* — Michael M Dollinger
*Assistant Examiner* — Christina H. W. Rosebach
(74) *Attorney, Agent, or Firm* — Sughrue Mion, PLLC

(57) ABSTRACT

A foam composition that includes a polymer material such as polyurethane or polyurea and a leachable water-soluble fine powder is provided. This composition can be used in a relatively simple process to obtain a foam body (porous body) that is uniform only at the surface or uniform throughout. The foam body can be suitably used as a golf ball member in golf balls required to have good controllability on approach shots. Also provided is a method for producing a foam member, which method includes the steps of molding the foam composition to obtain a solid molded body, and then leaching out and removing the water-soluble fine powder so as to obtain a foam-molded body.

8 Claims, No Drawings

FOAM COMPOSITION, FOAM MEMBER AND METHOD OF MANUFACTURE

CROSS-REFERENCE TO RELATED APPLICATION

This non-provisional application is a Divisional Application of U.S. application Ser. No. 16/720,955, filed Dec. 19, 2019, which claims priority under 35 U.S.C. § 119(a) on patent application No. 2018-239788 filed in Japan on Dec. 21, 2018, the entire contents of which are hereby incorporated by reference.

TECHNICAL FIELD

The present invention relates to a foam composition, a foam member and a method of manufacture thereof. More particularly, the invention relates to a foam composition, a foam member obtained from the foam composition that can be suitably used as a golf ball member such as the intermediate layer or cover of a golf ball, and a method for manufacturing the foam member.

BACKGROUND ART

Golf balls are required to have, among other characteristics, a good flight and stopping performance and a good scuff resistance. That is, golf balls have been developed so as to fly well on shots with a driver and also be receptive to backspin on approach shots. To this end, many cover materials with a high resilience and a good scuff resistance have been developed as golf ball members. However, when the resilience and scuff resistance of a golf ball member such as the cover are increased, the ball ends up flying too far on approach shots and lacks delicate controllability. Methods such as that of lowering the molecular weight of the cover material have been studied as ways of lowering the rebound resilience of golf ball members such as the cover. However, when the molecular weight is lowered, the scuff resistance and moldability of the cover material tend to worsen. Accordingly, there exists a desire among professional golfers and skilled amateurs for a golf ball which, in addition to having a cover or other golf ball member of high resilience and good scuff resistance, also is endowed with a better controllability on approach shots.

Art in which the cover member used in a golf ball is a foam body (porous body) has hitherto been described in a number of patent publications, including JP-A 2005-46299 (corresponding to U.S. 2004/266559 A1) and JP-A H01-212577 (corresponding to U.S. Pat. No. 4,274,637 A). However, in such art, a blowing agent such as an organic blowing agent or sodium hydrogen carbonate (sodium bicarbonate) is included in the cover-forming material. Molding methods involving the use of such a chemical blowing agent require close control of the temperature, pressure and equipment systems during molding. Also, obtaining a foam body that is uniform throughout the interior of the cover or other golf ball member is very difficult. In addition, in most foamed molding processes, a skin layer forms at the surface of the member, making it necessary to, for example, abrade the surface of the foamed golf ball cover in order to remove the skin layer and expose the foam face at the ball surface. In golf balls produced by such a process, the cover surface often is not a uniform foam body, making it difficult to supply, in golf balls for which close control of the diameter, weight and the like is required, a stable golf ball product.

SUMMARY OF THE INVENTION

It is therefore an object of the present invention to provide a foam composition from which a foam body (porous body) that is uniform only at the surface or uniform throughout can be obtained by a relatively simple method without the use of a blowing agent. Another object of the invention is to provide a golf ball member that is made using such a foam composition.

As a result of extensive investigations, I have discovered that, in order to obtain a foam body (porous body) which is uniform only at the surface or uniform throughout without the use of a blowing agent, by including a leachable water-soluble fine powder within the polymer material serving as the base material of the golf ball member and by molding the foam composition and subsequently leaching out and removing this water-soluble fine powder, an open-cell or closed-cell porous body is obtained in which the particulate shape of the water-soluble fine powder becomes the pores. Moreover, I have found that this method is relatively simple and industrially advantageous.

Accordingly, in a first aspect, the invention provides a foam composition which includes a polymer material and a leachable water-soluble fine powder.

In a preferred embodiment of the foam composition according to the first aspect of the invention, the polymer material is polyurethane or polyurea.

In another preferred embodiment of the foam composition, the water-soluble fine powder has an average particle size of from 1 to 800 μm.

In yet another preferred embodiment, the water-soluble fine powder has a melting point of at least 100° C.

In still another preferred embodiment, the water-soluble fine powder is at least one selected from the group consisting of sodium chloride, calcium chloride, potassium chloride, magnesium chloride, sodium sulfate, potassium sulfate, magnesium sulfate, sodium nitrate, calcium nitrate, potassium nitrate, sodium tetraborate, potassium tetraborate, calcium tetraborate, soluble starch, monosaccharides, disaccharides, trisaccharides, oligosaccharides, polysaccharides, and hydrates thereof.

In a further preferred embodiment, the content of the water-soluble fine powder is from 1 to 600 parts by weight per 100 parts by weight of the polymer material.

In a still further preferred embodiment, the water-soluble powder has a solubility in water of at least 1 g per 100 g of water at 20° C.

In a yet further preferred embodiment, the foam composition, when molded, yields a foam-molded body having a specific gravity of from 0.2 to 1.2.

In still another preferred embodiment, the foam composition, when molded, yields a foam-molded body having a rebound resilience, as measured in accordance with JIS-K 6255, of from 9 to 62%.

In a second aspect, the invention provides a method for producing a foam member, which method includes the steps of: molding the foam composition according to the first aspect of the invention so as to obtain a solid molded body; and then leaching out and removing the water-soluble fine powder, thereby giving a foam-molded body.

In a third aspect, the invention provides a foam member that can be used as an encasing member formed at a surface or periphery of a core material, which foam member is a foam-molded body obtained by the method according to the second aspect of the invention.

In a preferred embodiment of the third aspect of the invention, the foam member is a golf ball cover.

ADVANTAGEOUS EFFECTS OF THE INVENTION

With the foam composition of the invention, it is possible to obtain a foam body (porous body) that is uniform only at the surface or uniform throughout by a relatively simple process without using a blowing agent. The foam body can be suitably used in particular as a golf ball member for obtaining a golf ball which has a good controllability on approach shots.

DESCRIPTION OF THE PREFERRED EMBODIMENTS

The objects, features and advantages of the invention will become more apparent from the following detailed description.

The foam composition of the invention includes a polymer material and a leachable water-soluble fine powder.

In the present invention, the polymer material is not particularly limited. However, the polymer material required for satisfying the desired properties in the target product having a foam body (foam member) that is molded using a foam composition can be suitably selected from among known thermoplastic resins, thermoplastic elastomers, thermoset resins and thermoset elastomers.

For example, in cases where the foam body is to be used as a golf ball member, the polymer material that serves as the base material may be, for example, a rubber material or a thermoplastic or thermoset polyurethane elastomer, polyester elastomer, ionomeric resin, polyolefin elastomer or polyurea. These may be used singly or two or more may be used in admixture. In those cases in particular where the foam body is to be used as an encasing member such as a golf ball cover, preferred use can be made of polyurethane or polyurea.

The rubber material can be obtained by vulcanizing a rubber composition containing a base rubber as the chief component. This rubber material is formed using a rubber composition containing, for example, a base rubber, a co-crosslinking agent, a crosslink initiator, a metal oxide and an antioxidant. It is preferable to use polybutadiene as the base rubber of the rubber composition.

The polyurethane and polyurea are described in detail below.

Polyurethane

The polyurethane has a structure which includes soft segments composed of a polymeric polyol (polymeric glycol) that is a long-chain polyol, and hard segments composed of a chain extender and a polyisocyanate. Here, the polymeric polyol serving as a starting material may be any that has hitherto been used in the art relating to polyurethane materials, and is not particularly limited. This is exemplified by polyester polyols, polyether polyols, polycarbonate polyols, polyester polycarbonate polyols, polyolefin polyols, conjugated diene polymer-based polyols, castor oil-based polyols, silicone-based polyols and vinyl polymer-based polyols. Specific examples of polyester polyols that may be used include adipate-type polyols such as polyethylene adipate glycol, polypropylene adipate glycol, polybutadiene adipate glycol and polyhexamethylene adipate glycol; and lactone-type polyols such as polycaprolactone polyol. Examples of polyether polyols include poly(ethylene glycol), poly(propylene glycol), poly(tetramethylene glycol) and poly(methyltetramethylene glycol). Such long-chain polyols may be used singly, or two or more may be used in combination.

The long-chain polyol preferably has a number-average molecular weight in the range of 1,000 to 5,000. By using a long-chain polyol having a number-average molecular weight in this range, golf balls made with a polyurethane composition that have excellent properties, including a good rebound and a good productivity, can be reliably obtained. The number-average molecular weight of the long-chain polyol is more preferably in the range of 1,500 to 4,000, and even more preferably in the range of 1,700 to 3,500.

Here and below, "number-average molecular weight" refers to the number-average molecular weight calculated based on the hydroxyl value measured in accordance with JIS-K 1557.

The chain extender is not particularly limited; any chain extender that has hitherto been employed in the art relating to polyurethanes may be suitably used. In this invention, low-molecular-weight compounds with a molecular weight of 2,000 or less which have on the molecule two or more active hydrogen atoms capable of reacting with isocyanate groups may be used. Of these, preferred use can be made of aliphatic diols having from 2 to 12 carbon atoms. Specific examples include 1,4-butylene glycol, 1,2-ethylene glycol, 1,3-butanediol, 1,6-hexanediol and 2,2-dimethyl-1,3-propanediol. Of these, the use of 1,4-butylene glycol is especially preferred.

Any polyisocyanate hitherto employed in the art relating to polyurethanes may be suitably used without particular limitation as the polyisocyanate. For example, use can be made of one or more selected from the group consisting of 4,4'-diphenylmethane diisocyanate, 2,4-toluene diisocyanate, 2,6-toluene diisocyanate, p-phenylene diisocyanate, xylylene diisocyanate, 1,5-naphthylene diisocyanate, tetramethylxylene diisocyanate, hydrogenated xylylene diisocyanate, dicyclohexylmethane diisocyanate, tetramethylene diisocyanate, hexamethylene diisocyanate, isophorone diisocyanate, norbornene diisocyanate, trimethylhexamethylene diisocyanate, 1,4-bis(isocyanatomethyl)cyclohexane and dimer acid diisocyanate. However, depending on the type of isocyanate, crosslinking reactions during injection molding may be difficult to control.

The ratio of active hydrogen atoms to isocyanate groups in the polyurethane-forming reaction may be suitably adjusted within a preferred range. Specifically, in preparing a polyurethane by reacting the above long-chain polyol, polyisocyanate and chain extender, it is preferable to use the respective components in proportions such that the amount of isocyanate groups included in the polyisocyanate per mole of active hydrogen atoms on the long-chain polyol and the chain extender is from 0.95 to 1.05 moles.

The method for preparing the polyurethane is not particularly limited. Preparation using the long-chain polyol, chain extender and polyisocyanate may be carried out by either a prepolymer process or a one-shot process via a known urethane-forming reaction. Of these, melt polymerization in the substantial absence of solvent is preferred. Production by continuous melt polymerization using a multiple screw extruder is especially preferred.

It is preferable to use a thermoplastic polyurethane material as the polyurethane. The thermoplastic polyurethane material may be a commercial product, examples of which include those available under the trade name Pandex from DIC Covestro Polymer, Ltd., and those available under the trade name Resamine from Dainichiseika Color & Chemicals Mfg. Co., Ltd.

Polyurea

The polyurea is a resin composition composed primarily of urea linkages formed by reacting (i) an isocyanate with (ii) an amine-terminated compound. This resin composition is described in detail below.

(i) Isocyanate

Suitable use can be made here of an isocyanate that is used in the prior art relating to polyurethanes, although the isocyanate is not particularly limited. Use may be made of isocyanates similar to those mentioned above in connection with the polyurethane material.

(ii) Amine-Terminated Compound

An amine-terminated compound is a compound having an amino group at the end of the molecular chain. In this invention, the long-chain polyamines and/or amine curing agents shown below may be used.

A long-chain polyamine is an amine compound which has on the molecule at least two amino groups capable of reacting with isocyanate groups, and which has a number-average molecular weight of from 1,000 to 5,000. In this invention, the number-average molecular weight is more preferably from 1,500 to 4,000, and even more preferably from 1,900 to 3,000. Examples of such long-chain polyamines include, but are not limited to, amine-terminated hydrocarbons, amine-terminated polyethers, amine-terminated polyesters, amine-terminated polycarbonates, amine-terminated polycaprolactones, and mixtures thereof. These long-chain polyamines may be used singly, or two or more may be used in combination.

An amine curing agent is an amine compound which has on the molecule at least two amino groups capable of reacting with isocyanate groups and which has a number-average molecular weight of less than 1,000. In this invention, the number-average molecular weight is more preferably less than 800, and even more preferably less than 600. Specific examples of such amine curing agents include, but are not limited to, ethylenediamine, hexamethylenediamine, 1-methyl-2,6-cyclohexyldiamine, tetrahydroxypropylene ethylenediamine, 2,2,4- and 2,4,4-trimethyl-1,6-hexanediamine, 4,4'-bis(sec-butylamino)dicyclohexylmethane, 1,4-bis(sec-butylamino)cyclohexane, 1,2-bis(sec-butylamino) cyclohexane, derivatives of 4,4'-bis(sec-butylamino) dicyclohexylmethane, 4,4'-dicyclohexylmethanediamine, 1,4-cyclohexane bis(methylamine), 1,3-cyclohexane bis(methylamine), diethylene glycol di(aminopropyl) ether, 2-methylpentamethylenediamine, diaminocyclohexane, diethylenetriamine, triethylenetetramine, tetraethylenepentamine, propylenediamine, 1,3-diaminopropane, dimethylaminopropylamine, diethylaminopropylamine, dipropylenetriamine, imidobis(propylamine), monoethanolamine, diethanolamine, triethanolamine, monoisopropanolamine, diisopropanolamine, isophoronediamine, 4,4'-methylenebis (2-chloroaniline), 3,5-dimethylthio-2,4-toluenediamine, 3,5-dimethylthio-2,6-toluenediamine, 3,5-diethylthio-2,4-toluenediamine, 3,5-diethylthio-2,6-toluenediamine, 4,4'-bis (sec-butylamino)diphenylmethane and derivatives thereof, 1,4-bis(sec-butylamino)benzene, 1,2-bis(sec-butylamino) benzene, N,N'-dialkylaminodiphenylmethane, N,N,N',N'-tetrakis(2-hydroxypropyl)ethylenediamine, trimethylene glycol di-p-aminobenzoate, polytetramethylene oxide di-p-aminobenzoate, 4,4'-methylenebis(3-chloro-2,6-diethyleneaniline), 4,4'-methylenebis(2,6-diethylaniline), m-phenylenediamine, p-phenylenediamine and mixtures thereof. These amine curing agents may be used singly or two or more may be used in combination.

(iii) Polyol

Although not an essential ingredient, in addition to the above-described components (i) and (ii), a polyol may also be included in the polyurea. The polyol is not particularly limited, but is preferably one that has hitherto been used in the art relating to polyurethanes. Specific examples include the long-chain polyols and/or polyol curing agents mentioned below.

The long-chain polyol may be any that has hitherto been used in the art relating to polyurethanes. Examples include, but are not limited to, polyester polyols, polyether polyols, polycarbonate polyols, polyester polycarbonate polyols, polyolefin-based polyols, conjugated diene polymer-based polyols, castor oil-based polyols, silicone-based polyols and vinyl polymer-based polyols. These long-chain polyols may be used singly or two or more may be used in combination.

The long-chain polyol has a number-average molecular weight of preferably from 1,000 to 5,000, and more preferably from 1,700 to 3,500. In this average molecular weight range, an even better resilience and productivity are obtained.

The polyol curing agent is preferably one that has hitherto been used in the art relating to polyurethanes, but is not subject to any particular limitation. In this invention, use may be made of a low-molecular-weight compound having on the molecule at least two active hydrogen atoms capable of reacting with isocyanate groups, and having a molecular weight of less than 1,000. Of these, the use of aliphatic diols having from 2 to 12 carbon atoms is preferred. Specific examples include 1,4-butylene glycol, 1,2-ethylene glycol, 1,3-butanediol, 1,6-hexanediol and 2,2-dimethyl-1,3-propanediol. The use of 1,4-butylene glycol is especially preferred. The polyol curing agent has a number-average molecular weight of preferably less than 800, and more preferably less than 600.

A known method may be used to produce the polyurea. A prepolymer process, a one-shot process or some other known method may be suitably selected for this purpose.

When the above polyurethane or other resin is used as the base resin, the content thereof is suitably selected according to the required properties of the manufactured article that is desired. The lower limit is at least 50 wt %, preferably at least 60 wt %, and more preferably at least 80 wt %, per 100 wt % of the composition.

This invention, along with using the above polymer material, includes a leachable water-soluble fine powder within the foam composition. The water-soluble fine powder has an average particle size of preferably from 1 to 800 μm, more preferably from 2 to 600 μm, and even more preferably from 5 to 400 μm. As used herein, the average particle size (also called, for example, the "characteristic diameter") refers to the value determined by sampling 30 large particles from an enlarged image of the water-soluble powder obtained under, for example, an optical microscope, measuring the vertical and horizontal dimensions and determining their average for each particle, summing these particle-specific average values and dividing the total by n=30 ("n" being the number of measured particles).

The water-soluble fine powder has a melting point of preferably at least 100° C., more preferably at least 200° C., and even more preferably at least 300° C. In order to keep the polymer material from melting at the molding temperature, it is preferable for this melting point to be higher than the molding temperature of the polymer material. The molding temperature of golf balls is from 150 to 270° C. Examples of fine powders having a melting point higher than this temperature include sodium chloride (800° C.), potassium chloride (776° C.) and magnesium chloride (714° C.).

In order for the water-soluble fine powder used to be easily leached out and removed, it should have a solubility per 100 g of water at 20° C. of preferably at least 1 g, more preferably at least 10 g, and even more preferably at least 30 g.

A water-soluble compound such as salt or sugar may typically be used as the water-soluble fine powder. A compound that is easily rendered into a fine powder, does not dissolve at the molding and processing temperatures of the thermoplastic resin, and moreover can easily be extracted with water after molding is preferred.

The water-soluble fine powder may be selected from the group consisting of sodium chloride, calcium chloride, potassium chloride, magnesium chloride, sodium sulfate, potassium sulfate, magnesium sulfate, sodium nitrate, calcium nitrate, potassium nitrate, sodium tetraborate, potassium tetraborate, calcium tetraborate, soluble starch, monosaccharides, disaccharides, trisaccharides, oligosaccharides, polysaccharides, and hydrates thereof. These may be used singly or two or more may be used in admixture. The use of sodium chloride, sodium sulfate, sodium nitrate, calcium chloride and magnesium chloride is especially preferred.

The amount of water-soluble fine powder included in the foam composition is suitably selected according to the foam morphology—such as expansion ratio and foam cell size—desired in the foam member, but is typically from 1 to 600 parts by weight, and preferably from 1 to 400 parts by weight, per 100 parts by weight of the above polymer material used in the invention. For example, in cases where a golf ball cover material is to be rendered into a foam member, from the standpoint of the desired feel of the ball at impact and its controllability on approach shots, the content per 100 parts by weight of polyurethane resin is typically from 1 to 600 parts by weight, preferably from 1 to 400 parts by weight, more preferably from 1 to 200 parts by weight, and even more preferably from 1 to 100 parts by weight. In cases where a golf ball cover material is to be rendered into a visually recognizable foam member, from the standpoint of the desired feel at impact, sense of softness obtained from the appearance and controllability on approach shots, the content per 100 parts by weight of the polyurethane resin is preferably from 100 to 500 parts by weight, and more preferably from 200 to 400 parts by weight.

In addition, various additives other than the above ingredients may be optionally included in the inventive composition. For example, pigments, dispersants, antioxidants, light stabilizers, ultraviolet absorbers and internal mold lubricants may be suitably included. Various blowing agents such as chemical blowing agents are not included in this invention.

The foam composition can be obtained by mixing together and incorporating the above ingredients using any of various types of mixers, such as a kneading-type single-screw or twin-screw extruder, a Banbury mixer or a kneader.

In this invention, the foam composition is molded to form a solid molded body and the water-soluble fine powder contained within the solid molded body is subsequently leached out and removed, thereby obtaining an open-cell or closed-cell porous body (foam body) in which the particle shapes of the water-soluble fine powder have become pores.

The method used to mold the foam composition may be suitably selected according to the shape and nature of the manufactured article, which is a molded product. For example, the method used to mold a golf ball cover may entail feeding the above-described foam composition to an injection molding machine and injecting the molten foamable composition over the core so as to mold a cover. In this case, the molding temperature varies with the foam composition that is used; for polyurethane or polyurea, the molding temperature is typically in the range of 150 to 270° C. Another method that may be used is one in which the molten foam composition is shaped by pressing within a mold so as to obtain foam-molded bodies in the shape of half-cups, following which the core is enveloped by two such foam-molded half-cups and heat and pressure are applied in a press or the like, thereby molding a golf ball cover.

The water-soluble fine powder included in the molded material thus obtained from the foam composition is leached out and removed. The specific method for doing so, although not particularly limited, involves leaching out the water-soluble fine powder with water having a temperature of between about 5° C. and about 100° C., preferably between about 10° C. and about 80° C., and more preferably between about 20° C. and about 60° C. From the standpoint of the efficiency of the operation, it is preferable for the water-soluble powder to be capable of being leached out and removed in a short time at a high temperature, such as by immersion for a length of time during which the water-soluble fine powder can be fully leached out and removed with water at the above temperature, the length of time being typically from 10 minutes to 12 hours, preferably from 30 minutes to 8 hours, and more preferably from 1 to 6 hours. Methods for accelerating such leaching and removal may also be suitably selected and added. Examples include, but are not limited to, physical methods of removal such as shaking, stirring, rocking, aeration, microbubbles, ultrasound, high-pressure spraying and brushing. After the water-soluble fine powder has been leached out and removed, the foam-molded body can be obtained by thorough drying. The specific drying method used is not particularly limited, although the desired foam-molded body can be obtained after adhering water is thoroughly removed by using a dryer or a dehumidifying dryer to carry out drying at a temperature of, for example, up to 120° C., preferably up to 80° C., and more preferably up to 60° C.

The morphology of the foam cells in the molded material obtained from the foam composition is suitably selected according to the particle size and content of the water-soluble fine powder to be included in the polymer material. For example, in cases where sodium chloride is mixed as the water-soluble fine powder into polyurethane, the resulting composition is molded as a golf ball cover material and the sodium chloride is subsequently leached out with cold or hot water, at a low sodium chloride content, only the sodium chloride present at the surface of the golf ball cover leaches out and pore formation occurs only at the surface, with sodium chloride remaining behind at the interior. On the other hand, at a high sodium chloride content, mutually adjoining sodium chloride particles contiguously leach out, forming an open-cell foam body, with substantially all of the sodium chloride leaching out and being removed. It should be noted, however, that the sodium chloride, which has become even finer due to shear stresses, etc. that are applied when incorporating the sodium chloride into the polyurethane and when molding golf ball covers (as the foam-molded material) from the polyurethane and sodium chloride-containing foam composition, is taken up within the urethane. Some of this sodium chloride that has been taken up within the urethane does not come into contact with water and thus remains behind.

The molded material (foam body) obtained from the foam composition has a specific gravity of preferably from 0.2 to 1.2. In cases where the molded material is used as a cover member in golf balls, from the standpoint of both maintaining a good scuff resistance and keeping the initial velocity on approach shots low, it is generally preferable for the specific gravity to be from 1.0 to 1.2. In cases where the desired properties include a softer feel at impact and greater softness of appearance, the specific gravity is more preferably 1.0 or less.

When used in manufactured golf balls, from the standpoint of the flight performance, spin performance, etc. of the ball, this foam body has a rebound resilience, as measured in accordance with JIS-K 6255, which is preferably from 9 to 62%, and more preferably from 20 to 60%.

In this invention, the foam member (foam-molded body) obtained as described above is preferably used in particular as an encasing member that is formed at a surface or periphery of a member serving as a core material. Exemplary applications include, aside from golf balls, various other types of balls such as baseballs, billiard balls and bowling balls, as well as grips, electrical cable, fabric articles such as gloves and shoes, and also tires and rollers. In the case of golf balls, the core material is a single-layer or multilayer core made of rubber or the like, and the foam member corresponds to an encasing layer (also referred to as, for example, an intermediate layer, envelope layer or cover layer) which directly or indirectly encases this core.

EXAMPLES

The following Examples and Comparative Examples are provided to illustrate the invention, and are not intended to limit the scope thereof.

Examples 1 to 10, Comparative Example 1

A golf ball core-forming rubber composition formulated as shown in Table 1 and common to all of the Examples was prepared and then molded and vulcanized to produce a 38.6 mm diameter core.

TABLE 1

| Rubber composition | parts by weight |
|---|---|
| cis-1,4-Polybutadiene | 100 |
| Zinc acrylate | 27 |
| Zinc oxide | 4.0 |
| Barium sulfate | 16.5 |
| Antioxidant | 0.2 |
| Organic peroxide (1) | 0.6 |
| Organic peroxide (2) | 1.2 |
| Zinc salt of pentachlorothiophenol | 0.3 |
| Zinc stearate | 1.0 |

Details on the above core material are given below.

Cis-1,4-Polybutadiene: Available under the trade name "BR 01" from JSR Corporation
Zinc acrylate: From Nippon Shokubai Co., Ltd.
Zinc oxide: From Sakai Chemical Co., Ltd.
Barium sulfate: From Sakai Chemical Co., Ltd.
Antioxidant: Available under the trade name "Nocrac NS6" from Ouchi Shinko Chemical Industry Co., Ltd.
Organic peroxide (1): Dicumyl peroxide, available under the trade name "Percumyl D" from NOF Corporation
Organic peroxide (2): A mixture of 1,1-di(tert-butylperoxy)cyclohexane and silica, available under the trade name "Perhexa C-40" from NOF Corporation
Zinc stearate: Available from NOF Corporation Next, an intermediate layer-forming resin material common to all of the Examples was formulated. This intermediate layer resin material was a blend of 50 parts by weight of a sodium-neutralized ethylene-unsaturated carboxylic acid copolymer having an acid content of 18 wt % and 50 parts by weight of a zinc-neutralized ethylene-unsaturated carboxylic acid copolymer having an acid content of 15 wt % (for a combined amount of 100 parts by weight). This resin material was injection molded over a core having a diameter of 38.6 mm, thereby producing an intermediate layer-encased sphere having an intermediate layer with a thickness of 1.25 mm.

Preparation of Cover-Forming Resin Composition

In all of the Examples, an ether-type thermoplastic polyurethane (Shore D hardness, 40) available under the trade name Pandex from DIC Covestro Polymer, Ltd. was used as the thermoplastic polyurethane elastomer, and sodium chloride (average particle size, 350 μm; melting point, 800° C.; solubility in water, 36 g/100 g (20° C.)) was added thereto as the water-soluble fine powder. As shown in Table 2 below, cover-forming resin compositions for the respective Examples were prepared by suitably varying the amount of water-soluble fine powder added.

TABLE 2

| | Content (pbw) | No. 1 | No. 2 | No. 3 | No. 4 | No. 5 | No. 6 | No. 7 | No. 8 | No. 9 | No. 10 | No. 11 |
|---|---|---|---|---|---|---|---|---|---|---|---|---|
| Thermoplastic polyurethane elastomer (TPU) | | 100 | 100 | 100 | 100 | 100 | 100 | 100 | 100 | 100 | 100 | 100 |
| Water-soluble fine powder | | 0 | 5 | 10 | 20 | 30 | 40 | 50 | 100 | 200 | 400 | 600 |
| Sheet properties | Specific gravity | 1.12 | 1.12 | 1.12 | 1.11 | 1.09 | 1.06 | 1.05 | 1.03 | 0.31 | 0.26 | 0.24 |
| | Rebound resilience (%) | 55 | 50 | 50 | 43 | 40 | 40 | 37 | 28 | 9 | 9 | 9 |
| | Δ value (difference with No. 1) | 0 | −5 | −5 | −12 | −15 | −15 | −18 | −27 | −46 | −46 | −46 |

Fabrication of Sheet Samples for Evaluation

The blend in Table 1 was kneaded in a mixer, following which it was formed into a 2 mm thick sheet by pressing with a heated press. The sheet was then immersed for four hours in hot water having a temperature of 55° C., after which it was dried for 12 hours at 55° C., thereby obtaining the desired foam sheet sample.

Production of Golf Balls

Next, the above intermediate layer-encased sphere (diameter, 41.1 mm; weight, 40.8 g) was peripherally encased by the cover-forming resin composition. The resulting sphere encased by a cover (outermost layer) having a thickness after molding of 0.8 mm was subsequently immersed for four hours in hot water having a temperature of 55° C. and then dried at 55° C. for 12 hours. The cover-encased sphere thus obtained was then painted, thereby producing a three-piece golf ball having a diameter of 42.7 mm.

The golf balls produced as described above in the Examples and Comparative Example 1 were evaluated by the following methods for feel at impact, scuff resistance, and ball initial velocity and controllability on approach shots. The results are shown in Table 3.

Initial Velocity of Ball on Approach Shots

A sand wedge (SW) was mounted on a golf swing robot, and the initial velocity of the ball immediately after being struck at a head speed (HS) of 20 m/s was measured with an apparatus for measuring the initial conditions. The amount of decrease in the ball initial velocity ($\Delta V$) in each Example was computed relative to, as the standard, the initial velocity of the ball in Comparative Example 1.

Evaluation of Controllability on Approach Shots

Sensory evaluations of the ball controllability on approach shots were carried out as follows. The club used was a sand wedge (SW).
Excellent (Exc): Controllability was very good.
Good: Controllability was good.
No Good (NG): Controllability was somewhat poor.

Evaluation of Feel on Approach Shots

Sensory evaluations of the ball feel at impact on approach shots were carried out. The club used was a sand wedge (SW).
Excellent (Exc): Very soft feel at impact; easy to feel sweet spot.
Good: Soft feel at impact; easy to feel sweet spot.
No Good (NG): Rapid ball separation from club; cannot feel sweet spot.

Evaluation of Scuff Resistance

The golf balls were held isothermally at 23° C. and five balls of each type were hit at a head speed of 33 m/s using as the club a pitching wedge mounted on a swing robot machine. The damage to the ball from the impact was visually rated according to the following criteria.
Excellent (Exc): Slight scuffing or substantially no apparent scuffing.
Good: Slight fraying of surface or slight dimple damage.
No Good (NG): Dimples completely obliterated in places.

TABLE 3

| | | | Comp. Ex. 1 | Example 1 | 2 | 3 | 4 | 5 | 6 | 7 | 8 | 9 | 10 |
|---|---|---|---|---|---|---|---|---|---|---|---|---|---|
| | Cover formulation | | No. 1 | No. 2 | No. 3 | No. 4 | No. 5 | No. 6 | No. 7 | No. 8 | No. 9 | No. 10 | No. 11 |
| Ball performance | Approach shots | Initial velocity (m/s) | 19.08 | 18.99 | 18.70 | 18.70 | 18.70 | 17.99 | 17.94 | 17.94 | 17.61 | 17.29 | 16.91 |
| | | $\Delta V$ | 0 | −0.09 | −0.38 | −0.38 | −0.38 | −1.09 | −1.14 | −1.14 | −1.47 | −1.79 | −2.17 |
| | | Controllability | NG | good | good | good | good | good | good | good | Exc | Exc | Exc |
| | | Feel | NG | good | good | good | good | good | good | good | Exc | Exc | Exc |
| | | Scuff resistance | Exc | Exc | Exc | Exc | Exc | Exc | Exc | Exc | good | good | good |

$\Delta V$: Initial velocity difference with Comparative Example 1.

Japanese Patent Application No. 2018-239788 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method for producing a porous member, which method comprises the steps of, in order:
   molding a polymer composition comprising a polymer material and a leachable water-soluble fine powder so as to obtain a solid molded body; and
   leaching out and removing the water-soluble fine powder by water, thereby giving a porous molded body, wherein the polymer material is a thermoplastic polyurethane elastomer, the water-soluble fine powder has an average particle size of from 1 to 800 µm, the water-soluble powder has a solubility in water of at least 1 g per 100 g of water at 20° C., the content of the water-soluble fine powder is from 1 to 30 parts by weight per 100 parts by weight of the thermoplastic polyurethane elastomer, and the porous member is a golf ball cover.

2. The method of claim 1, wherein the water-soluble fine powder has a melting point of at least 100° C.

3. The method of claim 1, wherein the water-soluble fine powder is at least one selected from the group consisting of sodium chloride, calcium chloride, potassium chloride, magnesium chloride, sodium sulfate, potassium sulfate, magnesium sulfate, sodium nitrate, calcium nitrate, potassium nitrate, sodium tetraborate, potassium tetraborate, calcium tetraborate, soluble starch, monosaccharides, disaccharides, trisaccharides, oligosaccharides, polysaccharides, and hydrates thereof.

4. The method of claim 3, wherein the water-soluble fine powder is sodium chloride.

5. The method of claim 3, wherein the water-soluble fine powder is at least one selected from the group consisting of soluble starch, monosaccharides, disaccharides, trisaccharides, oligosaccharides, and polysaccharides.

6. The method of claim 1, wherein the content of the water-soluble fine powder is from 1 to 5 parts by weight per 100 parts by weight of the thermoplastic polyurethane elastomer.

7. The method of claim 1 which, when molded, yields a porous molded body having a specific gravity of from 0.2 to 1.2.

8. The method of claim 1 which, when molded, yields a porous molded body having a rebound resilience, as measured in accordance with JIS-K 6255, of from 9 to 62%.

* * * * *